United States Patent [19]

Burt et al.

[11] Patent Number: 5,753,027

[45] Date of Patent: May 19, 1998

[54] PIGMENTARY MATERIAL

[75] Inventors: Alan Burt, Pompano Beach, Fla.; Andrew L. Hulse, Audley; Richard L. O'Leary, Newcastle Under Lyme, both of United Kingdom

[73] Assignee: Cookson Matthey Ceramics plc, London, United Kingdom

[21] Appl. No.: 499,090

[22] Filed: Jul. 6, 1995

[30] Foreign Application Priority Data

Jul. 6, 1994 [GB] United Kingdom ............... 9413602

[51] Int. Cl.$^6$ .................. C01G 49/00; C09C 1/24; C09C 1/22; C09C 1/00
[52] U.S. Cl. ............................ 106/456; 106/459
[58] Field of Search .................. 106/459, 456; 252/62.6, 62.61, 62.59, 62.51 R, 62.56

[56] References Cited

U.S. PATENT DOCUMENTS

| | | | |
|---|---|---|---|
| 2,696,426 | 12/1954 | Marcot | 106/456 |
| 3,615,810 | 10/1971 | Holznagel et al. | 106/459 |
| 3,869,298 | 3/1975 | Suzuki et al. | 106/304 |
| 4,289,745 | 9/1981 | Patil | 423/594 |
| 4,404,254 | 9/1983 | Franz et al. | 252/62.59 |
| 4,826,537 | 5/1989 | Ostertag | 106/459 |
| 5,043,016 | 8/1991 | Speer et al. | 106/450 |
| 5,269,841 | 12/1993 | Kuske et al. | 106/456 |

FOREIGN PATENT DOCUMENTS

| | | | |
|---|---|---|---|
| 1189647 | 6/1985 | Canada. | |
| A1219612 | 6/1966 | Germany. | |
| 3640245 | 5/1988 | Germany. | |
| A3640245 | 5/1988 | Germany. | |
| 1082847 | 9/1967 | United Kingdom | 106/459 |

*Primary Examiner*—Melissa Bonner
*Attorney, Agent, or Firm*—Watson Cole Stevens Davis, P.L.L.C.

[57] ABSTRACT

A transparent hematite, useful as a pigmentary material, is in the form of particles consisting essentially in their lattice of oxygen, iron and another metal M, the other metal being selected from the group consisting of cobalt, nickel, manganese, zirconium, vanadium, lithium and copper, and being present in an atomic ratio to the iron of 0.01–0.5:1, and the width of the particles, as measured by transmission electron microscopy, being less than 0.03 micron.

22 Claims, No Drawings

PIGMENTARY MATERIAL

This invention relates to a transparent hematite, its production, a pigment comprising the hematite and a substance coloured by containing the pigment dispersed therein.

Iron oxide pigments are widely used in the construction, paper, rubber, plastics and paint industries. The pigments can be opaque or they can be transparent. The present invention is concerned with iron oxide materials which are transparent.

Transparent yellow iron oxide has the αFeOOH, goethite, structure, and transparent red iron oxide the hematite, αFe$_2$O$_3$, structure. Transparent iron oxides are difficult to prepare, careful control of reaction conditions being necessary, particularly in order to produce particles small enough to be transparent. U.S. Pat. No. 2,696,426 discusses such iron oxides and their production.

In addition, transparent iron oxides are available in only a small range of colours. To prepare transparent colour shades other than yellow or red, blending with other pigmentary materials is required. For instance, a transparent brown pigment can be produced by blending a transparent red or yellow iron oxide and carbon black, and a transparent orange pigment can be produced by blending a transparent red iron oxide pigment and a transparent yellow iron oxide pigment. Such blending involves a further production stage. Furthermore, the blends tend to separate out and not last in use; this is particularly noticeable in the case of brown pigments comprising mixtures of transparent yellow or red iron oxide with carbon black.

U.S. Pat. No. 4,289,745 discloses a temperature-stable spinel in the form of acicular particles having a length of 0.01 to 0.13 micron and consisting essentially of oxygen, iron and at least one other metal, said spinel corresponding to the formula $$XFe_2O_4$$

wherein X represents the other metal, which is selected from the group consisting of copper, calcium, cadmium, cobalt, barium, strontium and manganese.

U.S. Pat. No. 5,269,841 discloses a temperature-resistant black pigment which is a mixed oxide of manganese and iron with the structure of hematite and having a manganese content of 3 to 35% by weight, and with absolute colour values in colorimetric testing in paint systems, expressed in CIElab units in the lightened form (blend of 10 parts titanium dioxide and 1 part of black pigment) of 60 to 70 for L, −0.5 to 1.9 for a and −4 to −6.5 for b.

U.S. Pat. No. 4,826,537 discloses a lamellar pigment based on iron oxide of the formula Mn$_x$Al$_y$Fe$_{2-(x+y)}$O$_3$ where x is 0.01–0.06 and y is 0–0.2.

The present invention provides a transparent hematite in the form of particles consisting essentially in their lattice of oxygen, iron and another metal, the other metal being selected from the group consisting of cobalt, nickel, manganese, zirconium, vanadium, lithium and copper, and being present in an atomic ratio to the iron of 0.01–0.5:1, and the width of the particles, as measured by transmission electron microscopy, being less than 0.03 micron. The other metal is called M herein.

This invention provides also a process for preparing the transparent hematite, which process comprises:
(a) forming oxide or hydroxide of M on ferric oxyhydroxide particles to produce particles of ferric oxyhydroxide and oxide of M; and
(b) calcining the particles of ferric oxyhydroxide and oxide or hydroxide of M to produce the hematite.

The invention also provides a process for preparing the transparent hematite, which process comprises:
(a) admixing particles of oxide of M or of decomposable salt of M with particles of ferric oxyhydroxide; and
(b) calcining the resultant mixture to produce the hematite.

The invention also provides a pigment comprising the transparent hematite.

The invention provides also a substance coloured by containing the pigment dispersed therein.

The present transparent hematite is temperature stable, so that it can be employed in high temperature processing such as to colour plastics. The hematite weathers well. It can be produced readily. It can be produced in different colours, thus reducing or avoiding the need for blending.

The present particles are of hematite structure; this contrasts with the spinel of U.S. Pat. No. 4,289,745 mentioned above. The present hematite is transparent; this contrasts with the pigments of U.S. Pat. Nos. 5,269,841 and 4,826,537 mentioned above.

The present hematite particles usually have a width to depth ratio from 1:2 to 2:1, and hence are not lamellar. The particles usually have a length to width ratio of at least 3:1. The particles are preferably acicular (needle shaped).

The maximum dimension of the present particles is usually no more than 0.5 micron, preferably no more than 0.3 micron, especially no more than 0.2 micron. Particle sizes given herein are as measured by transmission electron microscopy unless otherwise indicated. The length of the particles is usually 0.01 to 0.2, for instance 0.04 to 0.2, for example 0.08 to 0.11, micron. The width of the particles is usually less than 0.02, for instance less than 0.01, for example less than 0.008, micron; in a particular embodiment the width is 0.004 to 0.008 micron.

The hematite usually has an a value on the CIElab colour coordinates system of 5.0 to 23.0, preferably 5.0 to 22.0, especially 8.9 to 22.0. Its b value is usually 5.0 to 28.0, preferably 15.0 to 28.0. In a preferred embodiment a is 5.0 to 23.0 and b is 5.0 to 28.0. The L value of the hematite is usually 45.0 to 73.0, preferably 45.0–67.0. In a preferred embodiment, L is 54.0 to 73.0, a 5.0 to 22.0 preferably 8.9 to 22.0 and b 5.0 to 28.0 preferably 15.0 to 28.0. Colour coordinates given herein are as measured in the lightened form (blend of 10 parts by weight of titanium dioxide and 1 part by weight of the hematite).

The atomic ratio of M to the iron in the present hematite is preferably 0.04–0.5:1, especially 0.04–0.12:1. In a particular embodiment the ratio is 0.02–0.15:1. The hematite can be approximately regarded as corresponding to the formula Fe$_2$O$_3$M$_x$ where x is double the present atomic ratio of M to iron.

The present elements are the essential constituents of the present hematite, but other elements can be present which do not mar its essential nature. Usually any such other elements total up to 5% by weight measured in the form of their oxides. The hematite preferably has a silica content of less than 1%, especially less than 0.3%, by weight. Similarly, though the present material is of hematite structure, it may be in admixture with minor amounts of other phases. Again, though the present particles are preferably acicular, admixed therewith can be a very small percentage (say less than 5% by weight) of the total which are not.

The specific surface area of the present hematite, as measured by the nitrogen adsorption method, is usually 80 to 120m$^2$g$^{-1}$.

M can be more than one of its specified elements, but preferably it is only one.

In a preferred aspect, the hematite has M selected from the group consisting of cobalt, nickel and manganese and has colour coordinates on the CIElab system of L 45.0 to 73.0, a 8.9 to 22.0 and b 15.0 to 28.0, preferably L 54.0 to 65.0, a 8.9 to 15.0 and b 15.0 to 20.0. The hematite of this aspect is an advantageous brown pigmentary material. M is preferably selected from the group consisting of cobalt and manganese, and is especially manganese. In a particularly preferred embodiment of this aspect, the atomic ratio of M to the iron is 0.09–0.12:1, for example 0.1:1.

In another preferred aspect, the hematite has M selected from the group consisting of zirconium, vanadium, lithium and copper and has colour coordinates on the CIElab system of L 64.0 to 73.0, a 15.0 to 22.0 and b 25.0 to 28.0. This hematite is an advantageous orange pigmentary material. M is preferably vanadium.

The present hematite can be prepared by a process comprising:

(a) forming oxide (usually hydrous oxide) or hydroxide of M on transparent ferric oxyhydroxide particles to produce particles of ferric oxyhydroxide and oxide of M; and (b) calcining the particles of ferric oxyhydroxide and oxide or hydroxide of M to produce the hematite.

In a preferred procedure, the oxide or hydroxide of M is formed on the ferric oxyhydroxide particles by admixing the particles with alkali and an aqueous solution of salt of M to precipitate the oxide or hydroxide of M. Alternatively, the ferric oxyhydroxide particles can be admixed with an aqueous solution or suspension of salt of M and spray dried to form the oxide or hydroxide of M on the particles.

Any salt of M is preferably selected from sulphates, nitrates and chlorides and is especially a sulphate.

Before calcination, the particles of ferric oxyhydroxide and oxide or hydroxide of M are usually washed—for instance by conventional techniques such as decantation or filtration—and dried—for instance using a spray dryer, oven dryer or belt dryer at 80°–200° C., preferably 80°–140° C.

The particles of ferric oxyhydroxide and oxide or hydroxide of M usually have a specific surface area, as measured by the nitrogen adsorption method, of 100–150m$^2$g$^{-1}$.

In a related process, the present hematite is prepared by a process comprising:

(a) admixing particles of oxide of M or of decomposable salt of M with transparent particles of ferric oxyhydroxide; and (b) calcining the resultant mixture to produce the hematite.

The decomposable salt of M is preferably a carbonate or hydroxide, especially a carbonate. In the calcination, the salt decomposes.

Before calcination, the mixture of particles of oxide of M or of decomposable salt of M with particles of ferric oxyhydroxide is usually washed and dried as described above for the first-mentioned process.

The particles of ferric oxyhydroxide again usually have a specific surface area, as measured by the nitrogen adsorption method, of 100–150m$^2$g$^{-1}$. What follows applies to both processes.

The ferric oxyhydroxide is usually of formula $Fe_2O_3.H_2O$, is preferably acicular, and is preferably αFeOOH.

The calcination is suitably at between 250° and 800° C., preferably between 250° and 500° C., for example between 340° and 500° C., for instance between 360° and 420° C. This preferred temperature contrasts with the calcination temperature in the process disclosed in U.S. Pat. No. 5,269,841 mentioned above, which discloses calcining its precipitated precursors at 500°–1000° C. preferably at 600°–800° C. The present calcination can be carried out in known way, for instance in a muffle furnace, conveyor furnace or rotary tube furnace. The residence time is usually from 15 to 60 minutes, preferably from 20 to 30 minutes. The calcination is usually conducted in an oxidising atmosphere, particularly air.

The calcination product is usually comminuted, for instance using a hammer or pin disc type of impact mill, to form a fine powder free from large aggregates. The product is then ready for use, particularly as a pigmentary material.

The particles of ferric oxyhydroxide can be prepared in known way. Preferably they have been prepared by oxidising ferrous oxyhydroxide particles.

The ferrous oxyhydroxide particles preferably have been prepared by admixing alkali with an aqueous ferrous salt solution to precipitate the ferrous oxyhydroxide particles. The initial oxidation of the ferrous oxyhydroxide particles tends to produce amorphous or poorly crystalline ferric oxyhydroxide particles. Accordingly, it is preferred that the ferric oxyhydroxide particles employed in stage (a) have been prepared by oxidising the ferrous oxyhydroxide particles to ferric oxyhydroxide particles, which are then admixed with alkali and an aqueous ferrous salt solution to precipitate further ferrous oxyhydroxide on the particles, and the ferrous oxyhydroxide is then oxidised on the particles to further ferric oxyhydroxide. In this way, initial ferric oxyhydroxide particles are employed as seed material which is built up by precipitating and oxidising further ferrous oxyhydroxide on them.

Any ferrous salt in the present process is usually one or more, conveniently one, of ferrous nitrate, ferrous chloride and ferrous sulphate. Any alkali is usually selected from the hydroxides, carbonates and bicarbonates of alkali metals and ammonia preferably sodium, potassium and ammonia. The alkali is particularly sodium hydroxide, sodium carbonate or ammonium hydroxide. Any oxidation can be carried out in known way, conveniently by air.

The present hematite can be in admixture with M oxide, for instance by reason of the process for preparing the hematite.

The present transparent hematite is preferably employed as a pigmentary material. A pigment comprising the hematite can contain also other pigmentary material, but preferably the hematite is employed as sole pigmentary material.

The present pigment can be employed in conventional way, particularly ways in which known transparent iron oxide pigments are employed.

The pigment can be employed as a dispersion in a liquid composition containing resin, for instance to admix into a paint system. Alternatively the pigment can be admixed directly into the paint system. The pigment can be used in a printing ink.

The pigment can be employed as a solid concentrate comprising the pigment dispersed in a polymer. The concentrate can be employed for instance to form a molten mixture with further polymer and the mixture then solidified into the required shape.

The pigment is preferably employed to colour surface coatings and plastics. Examples of surface coatings include woodstains and automotive finishes. The UV absorbance of the present hematite combined with its transparency affords protection and aesthetic appeal. The plastic can be for instance a transparent polymer such as polystyrene or polyethylene terephthalate.

The invention is illustrated by the following Examples.

The CIElab colour coordinates referred to in this specification for the present hematite are as measured, in a lightened form, as follows:

1. A dispersion of 66% by weight of the hematite is prepared in an alkyd resin system.
2. A blend of this dispersion with a white base resin is prepared to give a ratio of the hematite to titanium dioxide white pigment of 1:10, by weight.
3. The paint is drawn-down onto a black and white contrast card to give a 75 μm wet film thickness.
4. L, a, b values are determined using the following parameters:
Illuminant D65, 10° observer, specular included.

Examples 1–10

The following process was employed to prepare a range of doped hematites, details being given in the Table.

An alkaline solution is added to a reaction vessel and maintained between 15° and 21° C. The alkaline solution is 8780 cm$^3$ of an aqueous solution containing 0.29 mole of sodium hydroxide per liter, or an aqueous solution containing an equivalent weight of ammonium hydroxide or sodium carbonate.

3230 cm$^3$ of ferrous sulphate heptahydrate in aqueous solution containing 10 to 30 gl$^{-1}$Fe$^{2+}$ is introduced to the alkaline solution. The resultant slurry is oxidised with air at a high agitator speed, until the pH reaches a level which affords precipitation of transparent iron oxyhydroxide.

The slurry is left to settle until at least one third of the volume can be decanted. Liquid is then decanted off leaving the iron oxyhydroxide still in a slurry. 900 ml more ferrous sulphate heptahydrate aqueous solution, at a concentration of 45 to 55 gl$^{-1}$Fe$^{2+}$, is then added to the iron oxyhydroxide slurry.

Air is introduced to oxidise the slurry until the pH becomes constant. During oxidation, the pH is controlled between 4 and 5 by automatic delivery of more of the alkaline solution defined above.

The dopant metal M is added as an aqueous solution of the nitrate, chloride or sulphate, equivalent to 2–15 mol % M relative to the Fe. The pH is adjusted with the alkaline solution defined above, to afford hydrolysis of the M salt.

The resultant material is washed, filtered and dried between 80° and 140° C. The dried material is converted to hematite by calcination between 350° and 420° C., to remove 2 moles of water.

X-ray diffraction analysis of the product of Example 1 revealed a single crystalline phase, this having the structure of hematite ($\alpha Fe_2O_3$). No free manganese oxide phase was detected, and no magnetite ($Fe_3O_4$) or maghemite ($\gamma Fe_2O_3$) phase was detected. The atomic ratio of Mn to Fe in the product, calculated from wet chemical analysis, was 0.1:1.

The remaining Examples, which follow, were conducted following the procedure of the preceding Examples but with the variants mentioned.

Dopant

Example 11

The dopant metal M was cobalt, which was added as an aqueous solution of cobalt chloride in an amount sufficient to add 13 mol % Co relative to mol Fe. L=51.73, a=16.18, b=21.56.

Example 12

The dopant metal M was cobalt, which was added as an aqueous solution of cobalt nitrate, in an amount sufficient to add 8 mol % Co relative to mol Fe. L=48.84, a=12.82, b=17.17.

Example 13

The dopant metal M was cobalt, which was added as an aqueous solution of cobalt acetate, in an amount sufficient to add 10 mol % Co relative to mol Fe. L=48.00, a=12.33, b=16.61.

Example 14

The dopant metal M was manganese, which was added by the dry addition of manganese dioxide to the freshly precipitated goethite slurry, in an amount sufficient to add 12 mol % Mn relative to mol Fe. L=54.74, a=22.22, b=26.97.

Example 15

The dopant metal M was manganese, which was added as a freshly precipitated slurry of manganese carbonate. The slurry was prepared by mixing aqueous solutions of manganese sulphate and sodium carbonate to afford precipitation, and was employed in an amount sufficient to add 13 mol % Mn relative to mol Fe. L=47.09, a=10.97, b=15.21.

Example 16

The dopant metal M was manganese, which was added by the dry addition of manganese carbonate to the freshly

| Example | Dopant M | Mol % M | Colour | L | a | b |
| --- | --- | --- | --- | --- | --- | --- |
| 1 | Mn | 10% | Dark brown | 54.87 | 14.59 | 19.65 |
| 2 | Co | 10% | Dark brown | | | |
| 3 | Co | 5% | Brown | 55.22 | 11.30 | 16.72 |
| 4 | Mn/Ni | 6/6.5% | Brown | 65.04 | 8.95 | 16.19 |
| 5 | Co/Mn | 2.6/8.8% | Brown | 54.05 | 11.43 | 15.25 |
| 6 | Zr/Co | 3.05/3.05% | Mid-brown particularly | 64 → 73 60.52 | 15 → 22 16.00 | 25 → 28 20.85 |
| 7 | Zr/Li | 3.05/3.05% | Orange/brown particularly | 64 → 73 62.45 | 15 → 22 20.15 | 25 → 28 24.34 |
| 8 | Li | 5% | Red/brown particularly | 64 → 73 61.21 | 15 → 22 47.80 | 25 → 28 22.22 |
| 9 | Zr | 6.1% | Orange particularly | 64 → 73 63.80 | 15 → 22 17.74 | 25 → 28 24.76 |
| 10 | V | 6.1% | Orange particularly | 64 → 73 63.68 | 15 → 22 16.41 | 25 → 28 24.70 | precipitated goethite slurry, in an amount sufficient to add 11 mol % Mn relative to mol Fe. L=52.67, a=18.37, b=23.49.

Example 17

The dopant material M was cobalt, which was added as an aqueous solution of cobalt sulphate, and sodium hydroxide was added to afford precipitation of the dopant, in an amount sufficient to add 10 mol % Co relative to mol Fe. L=48.13, a=11.85, b=16.37.

Example 18

The dopant metal M was manganese, which was added as an aqueous solution of manganese sulphate, and ammonium hydroxide was added to afford precipitation of the dopant, in an amount sufficient to add 10 mol % Mn relative to mol Fe. L=51.33, a=16.50, b=21.88.

Example 19

The dopant metal M was manganese, which was added as an aqueous solution of manganese sulphate, and sodium carbonate was added to afford precipitation of the dopant, in an amount sufficient to add 1 mol % Mn relative to mol Fe. L=54.60, a=22.88, b=27.59.

Example 20

The dopant metal M was manganese, which was added as an aqueous solution of manganese sulphate, and sodium carbonate was added to afford precipitation of the dopant, in an amount sufficient to add 30 mol % Mn relative to mol Fe. L=48.19, a=12.32, b=18.10.

Example 21

The dopant metal M was manganese, which was added as an aqueous solution of manganese sulphate, and sodium carbonate was added to afford precipitation of the dopant in an amount sufficient to add 45 mol % Mn relative to mol Fe. L=49.18, a=10.70, b=16.74.

Example 22

The dopant metal M was a combination of zirconium and cobalt. They were added as an aqueous solution of zirconyl chloride and cobalt sulphate respectively, and sodium carbonate was added to afford precipitation of the dopants, in an amount sufficient to add 3.5 mol % of each of Zr and Co relative to mol Fe. L=60.52, a=16.00, b=20.85.

Precipitation Conditions

Example 23

Goethite was prepared utilising sodium hydroxide solution as the alkaline solution. The dopant metal M was manganese, which was added as an aqueous solution of manganese sulphate, and further sodium hydroxide was added to afford precipitation of the dopant, in an amount sufficient to add 10 mol % Mn relative to mol Fe. L=50.30, a=14.25, b=21.22.

Example 24

Goethite was prepared utilising ammonium hydroxide solution as the alkaline solution. The dopant metal M was manganese, which was added as an aqueous solution of manganese sulphate, and further ammonium hydroxide was added to afford precipitation of the dopant, in an amount sufficient to add 10 mol % Mn relative to mol Fe. L=55.89, a=9.84, b=19.26.

Example 25

Goethite was prepared utilising ferrous chloride solution as the iron-containing solution and sodium carbonate as the alkaline solution. The slurry obtained on mixing the two solutions was oxidised to constant pH over the temperature range 15°–21° C. No further addition of ferrous species was made. Accordingly, in effect a single stage self seeding technique was employed.

The dopant metal M was manganese, which was added as an aqueous solution of manganese sulphate, and further sodium hydroxide was added to afford precipitation of the dopant, in an amount sufficient to add 10 mol % Mn relative to mol Fe. L=57.70, a=9.03, b=16.94.

Example 26

Goethite was prepared as described in Example 1. The slurry was heated to 50° C. throughout the second ferrous addition and subsequent oxidation.

The dopant metal M was manganese, which was added as an aqueous solution of manganese sulphate, and further sodium hydroxide was added to afford precipitation of the dopant, in an amount sufficient to add 10 mol % Mn relative to mol Fe. L=50.15, a=13.96, b=18.80.

Example 27

Goethite was prepared as described in Example 1. The slurry was heated to 70° C. throughout the second ferrous addition and subsequent oxidation.

The dopant metal M was manganese, which was added as an aqueous solution of manganese sulphate, and further sodium hydroxide was added to afford precipitation of the dopant, in an amount sufficient to add 10 mol % Mn relative to mol Fe. L=50.93, a=15.21, b=18.91.

Example 28

Geothite was prepared utilising ferrous sulphate solution containing 30 $gl^{-1}$, and sodium carbonate as the alkaline solution. The slurry obtained on mixing the two solutions was oxidised to constant pH over the temperature range 15°–21° C. No further addition of ferrous species was made. Accordingly, in effect a single stage self seeding technique was employed.

The dopant metal M was manganese, which was added as an aqueous solution of manganese sulphate, and further sodium hydroxide was added to afford precipitation of the dopant, in an amount sufficient to add 10 mol % Mn relative to mol Fe. L=66.07, a=9.42, b=15.07.

Example 29

Geothite was prepared utilising ferrous sulphate solution containing 30 $gl^{-1}$, and sodium carbonate as the alkaline solution. Further ferrous sulphate solution containing 60 $gl^{-1}$ $Fe^{+2}$ was added to the decanted slurry. The temperature was maintained between 55°–60° C. throughout the second ferrous addition and subsequent oxidation.

The dopant metal M was manganese, which was added as an aqueous solution of manganese sulphate, and further sodium hydroxide was added to afford precipitation of the dopant, in an amount sufficient to add 10 mol % Mn relative to mol Fe. L=59.95, a=12.27, b=18.90.

Processing

Example 30

The slurry of geothite and oxide or hydroxide of M was washed with mains water and spray dried.

The dopant metal M was manganese, which was added as an aqueous solution of manganese sulphate, and further sodium hydroxide was added to afford precipitation of the dopant, in an amount sufficient to add 10 mol % Mn relative to mol Fe. L=59.58, a=13.89, b=19.94.

Example 31

The slurry of geothite and oxide or hydroxide of M was washed with mains water and freeze dried.

The dopant metal M was manganese, which was added as an aqueous solution of manganese sulphate, and further sodium hydroxide was added to afford precipitation of the dopant, in an amount sufficient to add 10 mol % Mn relative to mol Fe. L=59.02, a=14.10, b=20.12.

Example 32

The slurry of geothite and oxide or hydroxide of M was washed with mains water and filtered, using a Buchner funnel and flask. The resultant press-cake was dried at 200° C.

The dopant metal M was manganese, which was added as an aqueous solution of manganese sulphate, and further sodium hydroxide was added to afford precipitation of the dopant, in an amount sufficient to add 10 mol % Mn relative to mol Fe. L=51.21, a=15.82, b=21.01.

Example 33

The slurry of geothite and oxide or hydroxide of M was washed with mains water and filtered, using a Buchner funnel and flask. The resultant press-cake was dried at 180° C.

The dopant metal M was manganese, which was added as an aqueous solution of manganese sulphate, and further sodium hydroxide was added to afford precipitation of the dopant, in an amount sufficient to add 10 mol % Mn relative to mol Fe. L=58.61, a=13.92, b=19.66.

Example 34

The slurry of geothite and oxide or hydroxide of M was washed with mains water and filtered, using a Buchner funnel and flask. The resultant press-cake was calcined at 380° C. to convert it to hematite.

The dopant metal M was manganese, which was added as an aqueous solution of manganese sulphate, and further sodium hydroxide was added to afford precipitation of the dopant, in an amount sufficient to add 10 mol % Mn relative to mol Fe. L=53.19, a=14.12, b=20.05.

Example 35

The slurry of geothite and oxide or hydroxide of M was washed with mains water and filtered, using a Buchner funnel and flask. The resultant press-cake was dried at 140° C. and calcined in a belt furnace at 400° C.

The dopant metal M was manganese, which was added as an aqueous solution of manganese sulphate, and further sodium hydroxide was added to afford precipitation of the dopant, in an amount sufficient to add 10 mol % Mn relative to mol Fe. L=56.18, a=16.23, b=23.42.

Example 36

The slurry of geothite and oxide or hydroxide of M was washed with mains water and filtered, using a Buchner funnel and flask. The resultant press-cake was dried at 140° C. and calcined at 250° C. in a muffle furnace.

The dopant metal M was manganese, which was added as an aqueous solution of manganese sulphate, and further sodium hydroxide was added to afford precipitation of the dopant, in an amount sufficient to add 10 mol % Mn relative to mol Fe. L=60.54, a=14.95, b=24.75.

Example 37

The slurry of geothite and oxide or hydroxide of M was washed with mains water and filtered, using a Buchner funnel and flask. The resultant press-cake was dried at 140° C. and calcined at 500° C. in a muffle furnace.

The dopant metal M was manganese, which was added as an aqueous solution of manganese sulphate, and further sodium hydroxide was added to afford precipitation of the dopant, in an amount sufficient to add 10 mol % Mn relative to mol Fe. L=50.97, a=15.01, b=20.81.

Example 38

The slurry of geothite and oxide or hydroxide of M was washed with mains water and filtered, using a Buchner funnel and flask. The resultant press-cake was dried at 140° C. and calcined at 800° C. in a muffle furnace.

The dopant metal M was manganese, which was added as an aqueous solution of manganese sulphate, and further sodium hydroxide was added to afford precipitation of the dopant, in an amount sufficient to add 10 mol % Mn relative to mol Fe. L=51.36, a=12.33, b=15.83.

Particle size measurements determined from transmission electron photomicrographs of products of the Examples, are shown in the following Table.

The figures for length and width are averages from measurements taken on 6 particles, except in the case of Example 38 where measurements are given for each particle measured—these illustrate the range of particle shapes and sizes present in the product of this Example.

TABLE

| EXAMPLE | LENGTH, μm | WIDTH, μm |
| --- | --- | --- |
| 1 | 0.06 | 0.009 |
| 2 | 0.035 | 0.010 |
| 14 | 0.043 | 0.007 |
| 15 | 0.058 | 0.008 |
| 21 | 0.070 | 0.010 |
| 23 | 0.060 | 0.005 |
| 25 | 0.039 | 0.009 |
| 27 | 0.065 | 0.009 |
| 28 | 0.066 | 0.008 |
| 29 | 0.042 | 0.007 |
| 38 | 0.055 | 0.01 |
|  | 0.025 | 0.02 |
|  | 0.035 | 0.025 |
|  | 0.035 | 0.035 |
|  | 0.075 | 0.040 |
|  | 0.120 | 0.035 |

We claim:

1. A transparent hematite in the form of particles consisting essentially in their lattice of oxygen, iron and another metal M, the other metal being selected from the group consisting of cobalt, nickel, manganese, zirconium, vanadium, lithium and copper, and being present in an atomic ratio to the iron of 0.01–0.5:1, and the width of the particles, as measured by transmission electron microscopy, being less than 0.03 micron.

2. A hematite according to claim 1 wherein the particles are acicular.

3. A hematite according to claim 1 wherein the atomic ratio to the iron is 0.02–0.15:1.

4. A hematite according to claim 1 wherein the width of the particles is less than 0.01 micron.

5. A hematite according to claim 1 wherein the length of the particles, as measured by transmission electron microscopy, is 0.01 to 0.2 micron.

6. A hematite according to claim 1 having colour coordinates on the CIElab system in the lightened form (blend of 10 parts by weight of titanium dioxide and 1 part by weight of the hematite) of a 5.0 to 23.0 and b 5.0 to 28.0.

7. A hematite according to claim 1 wherein M is selected from the group consisting of cobalt, nickel and manganese, and having colour coordinates on the CIElab system of L 45.0 to 73.0, a 8.9 to 22.0 and b 15.0 to 28.0.

8. A hematite according to claim 7 wherein M is selected from the group consisting of cobalt and manganese.

9. A hematite according to claim 8 wherein M is manganese.

10. A hematite according to claim 1 wherein M is selected from the group consisting of zirconium, vanadium, lithium and copper, and having colour coordinates on the CIElab system of L 64.0 to 73.0, a 15.0 to 22.0 and b 25.0 to 28.0.

11. A hematite according to claim 10 wherein M is vanadium.

12. A process for preparing a hematite claimed in claim 1, which process comprises:

(a) forming oxide or hydroxide of M on transparent ferric oxyhydroxide particles to produce particles of ferric oxyhydroxide and oxide or hydroxide of M; and (b) calcining the particles of ferric oxyhydroxide and oxide or hydroxide of M to produce the hematite.

13. A process according to claim 12 wherein the oxide or hydroxide of M is formed on the transparent ferric oxyhydroxide particles by admixing the particles with alkali and an aqueous solution of salt of M to precipitate the oxide or hydroxide of M.

14. A process for preparing a hematite claimed in claim 1, which process comprises:

(a) admixing particles of oxide of M or of decomposable salt of M with transparent particles of ferric oxyhydroxide; and (b) calcining the resultant mixture to produce the hematite.

15. A process according to claim 12 wherein the calcination is between 250° and 800° C.

16. A process according to claim 12 wherein the ferric oxyhydroxide is $\alpha$FeOOH.

17. A process according to claim 12 wherein the ferric oxyhydroxide particles have been prepared by oxidising the precipitated material obtained by admixing alkali with an aqueous ferrous salt solution to produce a precipitate.

18. A process according to claim 12, wherein the ferric oxyhydroxide particles have been prepared by oxidising the precipitated material, obtained by admixing alkali with an aqueous ferrous salt solution to produce a precipitate, to produce first oxidised particles and then admixing the first oxidised particles with further alkali and further aqueous ferrous salt solution to precipitate further material on the particles, and the further material is then oxidised on the first oxidised particles to produce further ferric oxyhydroxide.

19. A process according to claim 17 wherein the alkali is selected from the hydroxides, carbonates and bicarbonates of alkali metals and ammonia.

20. A process according to claim 17 wherein the oxidation is by air.

21. A pigment comprising the hematite claimed in claim 1.

22. A colored substance containing the pigment of claim 21.

* * * * *